(12) United States Patent
Hymel (10) Patent No.: US 8,863,020 B2
(45) Date of Patent: Oct. 14, 2014

(54) PORTABLE ELECTRONIC DEVICE AND METHOD OF CONTROLLING SAME

(75) Inventor: James Allen Hymel, Waterloo (CA)

(73) Assignee: Blackberry Limited, Waterloo (CA)

( * ) Notice: Subject to any disclaimer, the term of this patent is extended or adjusted under 35 U.S.C. 154(b) by 353 days.

(21) Appl. No.: 12/958,789

(22) Filed: Dec. 2, 2010

(65) Prior Publication Data

US 2012/0144338 A1 Jun. 7, 2012

(51) Int. Cl.
*G06F 3/0484* (2013.01)
*G06F 3/0488* (2013.01)

(52) U.S. Cl.
CPC .. *G06F 3/04886* (2013.01); *G06F 2203/04806* (2013.01); *G06F 3/04842* (2013.01); *G06F 3/04883* (2013.01)
USPC ........... 715/773; 715/771; 715/835; 715/764; 345/173; 345/156; 345/168

(58) Field of Classification Search
CPC ......................... G06F 3/04883; G06F 3/04886
USPC ....................................................... 715/773
See application file for complete search history.

(56) References Cited

U.S. PATENT DOCUMENTS

| 7,098,896 | B2 * | 8/2006 | Kushler et al. | 345/168 |
|---|---|---|---|---|
| 7,199,786 | B2 * | 4/2007 | Suraqui | 345/168 |
| 7,250,938 | B2 * | 7/2007 | Kirkland et al. | 345/168 |
| 7,434,177 | B1 * | 10/2008 | Ording et al. | 715/862 |
| 8,044,827 | B2 * | 10/2011 | Jarczyk | 341/22 |
| 8,106,890 | B2 * | 1/2012 | Do et al. | 345/173 |
| 8,358,277 | B2 * | 1/2013 | Mosby et al. | 345/173 |
| 8,619,036 | B2 * | 12/2013 | Mosby et al. | 345/168 |
| 8,656,296 | B1 * | 2/2014 | Ouyang et al. | 715/770 |
| 8,667,414 | B2 * | 3/2014 | Zhai et al. | 715/773 |
| 8,669,941 | B2 * | 3/2014 | Sharan et al. | 345/168 |
| 8,701,032 | B1 * | 4/2014 | Zhai et al. | 715/773 |
| 8,701,050 | B1 * | 4/2014 | Starner et al. | 715/863 |
| 8,704,792 | B1 * | 4/2014 | Kataoka et al. | 345/173 |
| 8,707,195 | B2 * | 4/2014 | Fleizach et al. | 715/773 |
| 2005/0052406 | A1 * | 3/2005 | Stephanick et al. | 345/156 |
| 2006/0232551 | A1 * | 10/2006 | Matta | 345/156 |
| 2008/0098331 | A1 * | 4/2008 | Novick et al. | 715/835 |
| 2010/0066695 | A1 * | 3/2010 | Miyazaki | 345/173 |
| 2010/0194694 | A1 * | 8/2010 | Kraft et al. | 345/173 |

FOREIGN PATENT DOCUMENTS

EP 2163975 A2 3/2010

OTHER PUBLICATIONS

McGuffin M J et al: "Fitts' Law and Expanding Targets: Experimental Studies and Designs for User Interfaces", ACM Transactions on Computer-Human Interaction, ACM, New York, NY, US, vol. 12, No. 4, Dec. 1, 2005, pp. 388-422, XP002603487, ISSN: 1073-0516.

(Continued)

*Primary Examiner* — William Bashore
*Assistant Examiner* — Reza Nabi
(74) *Attorney, Agent, or Firm* — Geoffrey deKleine; Borden Ladner Gervais LLP (57) ABSTRACT

A method includes displaying one or more selectable features on a touch-sensitive display of a portable electronic device, detecting a gesture on the touch-sensitive display, identifying at least one of the selectable features based on a direction of the gesture, and increasing a size of the at least one of the selectable features.

13 Claims, 6 Drawing Sheets

(56) References Cited

OTHER PUBLICATIONS

Extended European Search Report dated May 4, 2011, issued in respect of corresponding European Patent Application No. 10193487.5.
Website: http://www.citibankegypt.com/egypt/consumer/cbolhelp3.htm#16 published at least as early as Mar. 9, 2010.
Website: http://www.macrumors.com/2009/09/02/snow-leopards-keyboard-viewer-sparks-renewed-speculation-regarding-mac-os-x-based-tablet/ published at least as early as Mar. 9, 2010.
Website: http://www.thickbuttons.com/index.php?f=about published at least as early as Mar. 9, 2010.
Website: http://gadgetsteria.com/2010/01/25/thickbuttons-aims-to-give-swype-other-text-input-applications-a-run-for-your-attention published at least as early as Mar. 9, 2010.
Website: http://www.qwerted.com/ published at least as early as Mar. 9, 2010.
Website: http://www.broadbandgenie.co.uk/news/20080806778/is-the-iphone-s-predictive-text-too-clever-for-its-own-good published at least as early as Mar. 9, 2010.
Website: http://www.smartphonemag.com/cms/blog/108/new-interkey-keyboard published at least as early as Mar. 10, 2010.
Website: http://www.applelinks.com/index.php/more/iphone_first_impressions_part_11/ published at least as early as Mar. 10, 2010.
Website: http://swype.uservoice.com/forums/17482-general/suggestions/448414-vibration-feedback-for-swype published at least as early as Mar. 9, 2010.
Examiner's Report dated Oct. 28, 2013, issued from the corresponding Canadian patent application No. 2,756,315.

* cited by examiner

PORTABLE ELECTRONIC DEVICE AND METHOD OF CONTROLLING SAME

FIELD OF TECHNOLOGY

The present disclosure relates to a portable electronic device including a touch screen display and control of the electronic device.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive or touchscreen devices are desirable.

BRIEF DESCRIPTION OF THE DRAWINGS

Embodiments of the present disclosure will now be described, by way of example only, with reference to the attached figures, wherein.

DETAILED DESCRIPTION

The following describes a portable electronic device and a method that includes displaying one or more selectable features on a touch-sensitive display of the portable electronic device, detecting a gesture on the touch-sensitive display, identifying at least one of the selectable features based on a direction of the gesture, and increasing a size of the at least one of the selectable features.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, personal digital assistants, tablet computers, and so forth. The portable electronic device may also be a portable electronic device without wireless communication capabilities, such as a handheld electronic game device, digital photograph album, digital camera, or other device.

Figure 1:
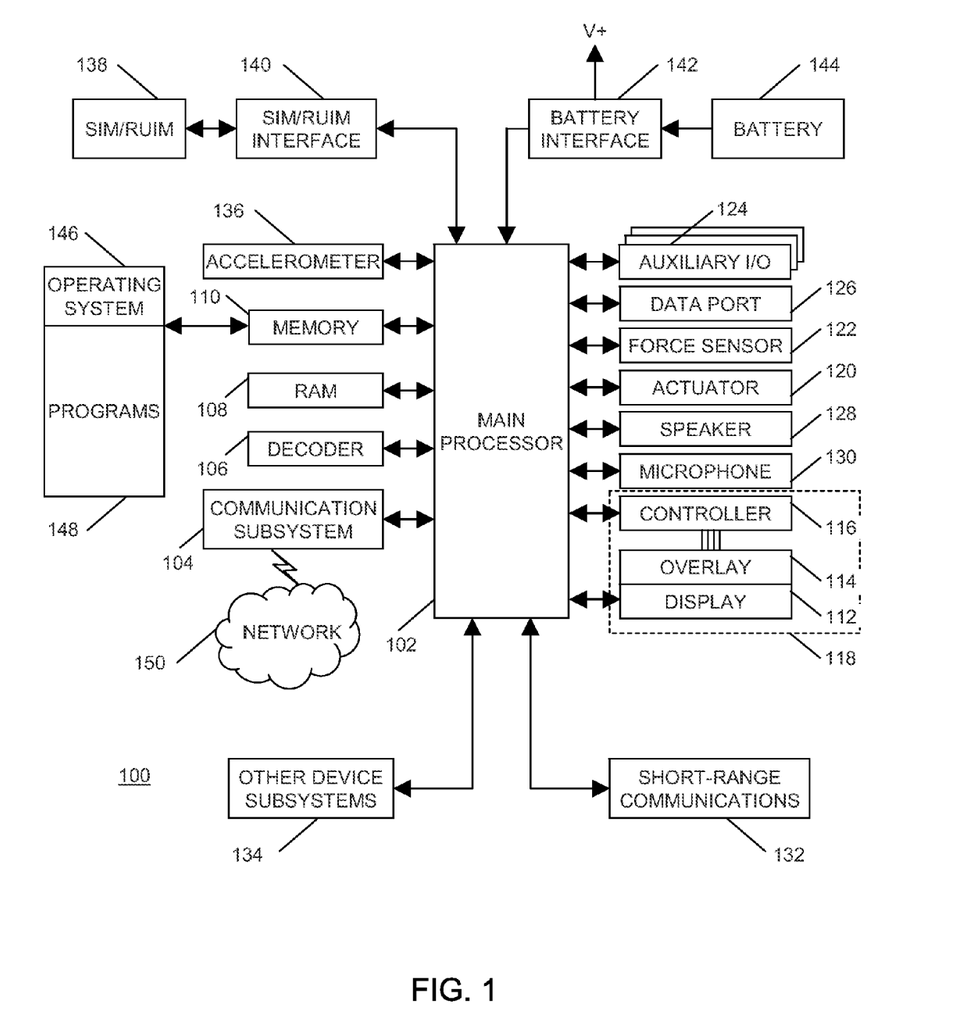
FIG. 1 is a block diagram of an example of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators 120 and one or more force sensors 122. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x and y components may be determined by signals generated from the touch-sensor layers, also referred to as touch sensors. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The direction may be referenced with respect to the touch-sensitive display 118, the orientation of the information displayed on the touch-sensitive display 118, or another reference. The origin point and the finishing point of the swipe may be utilized to determine the magnitude or distance of the swipe. The processor 102 receives data from the controller 116 to determine the direction, magnitude, and duration of the swipe.

The optional actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

A mechanical dome switch actuator may be utilized. In this example, tactile feedback is provided when the dome collapses due to imparted force and when the dome returns to the rest position after release of the switch.

Alternatively, the actuator 120 may comprise one or more piezoelectric (piezo) actuators that provide tactile feedback for the touch-sensitive display 118. Contraction of the piezo actuator(s) applies a spring-like force, for example, opposing a force externally applied to the touch-sensitive display 118. Each piezo actuator includes a piezoelectric device, such as a piezoelectric disk, adhered to a substrate such as a metal substrate. The substrate bends when the piezoelectric device contracts due to build up of charge/voltage at the piezoelectric device or in response to a force, such as an external force applied to the touch-sensitive display 118. The charge/voltage may be adjusted by varying the applied voltage or current, thereby controlling the force applied by the piezo actuators. The charge/voltage at the piezo actuator may be removed by a controlled discharge current that causes the piezoelectric device to expand, decreasing the force applied by the piezo actuators. The charge/voltage may be removed over a relatively short period of time to provide tactile feedback to the user. Absent an external force and absent a charge/voltage at the piezo actuator, the piezo actuator may be slightly bent due to a mechanical preload.

Figure 2:
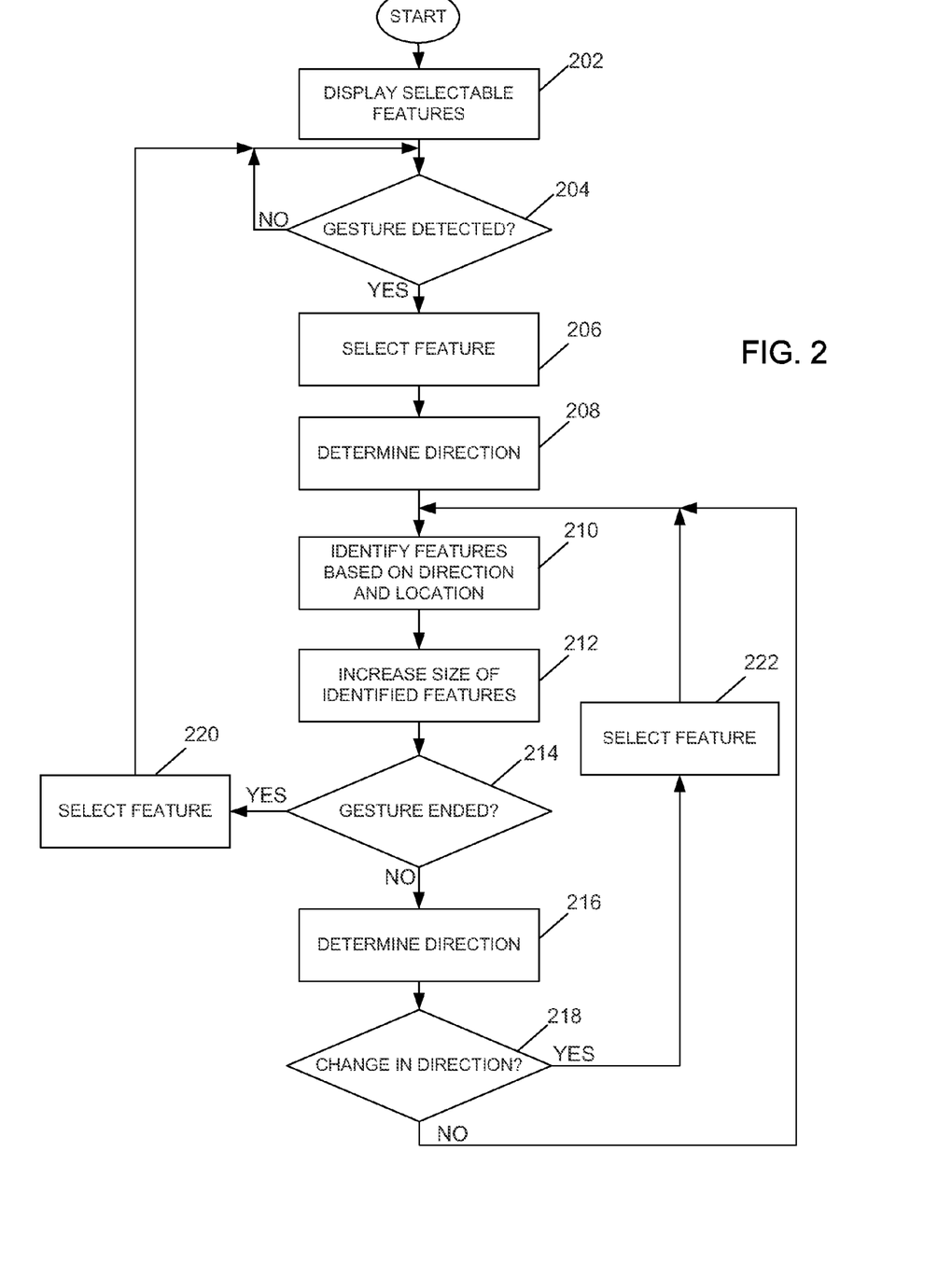
FIG. 2 is a flowchart illustrating an embodiment of a method of facilitating selection of a selectable feature displayed on a touch-sensitive display of a portable electronic device in accordance with the present disclosure.

FIG. 2 is a flowchart illustrating an example of a method of facilitating selection of a selectable feature displayed on a touch-sensitive display of a portable electronic device in accordance with the present disclosure. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

When a user selects features with a finger or thumb, the user may select each feature by touching the touch-sensitive display at a location corresponding to the displayed feature. With the small size of portable electronic devices, a user's thumb or finger may cover part or all of a selectable feature. For example, when typing on a virtual keyboard, a user's thumb may cover keys of the keyboard making selection difficult. Using a swipe method, a user may select multiple keys by moving from key to key without lifting the finger or thumb. Utilizing this method, a user's hand or thumb may cover keys of the keyboard, again making accurate selection of keys difficult.

Selectable features are displayed on the touch-sensitive display 118 at 202. When a gesture is detected at 204, the selectable feature associated with the location at which the gesture originates is selected at 206. A direction of the gesture, also referred to herein as the touch, is determined while the gesture is detected and is ongoing at 208. To determine the direction of the gesture, two points along the path of the gesture are utilized to determine a vector that describes the direction. Based on the location of the touch at the time the direction of the gesture is determined and based on the direction, selectable features that are displayed on the touch-sensitive display 118 are identified at 210. The selectable features identified may be features that lie in the direction of the gesture, beginning at the location of the touch at the time the direction is determined. Features that are located behind the location of the touch at the time the direction is determined, or in the opposite direction, are not identified. The selectable features that are identified may include, for example, all features that lie in the direction of the gesture determined at 208. Alternatively, the selectable features identified may include features that are within some distance of a line in the direction determined at 208. The determined distance may be predetermined or preset. Alternatively, the area may be dependent on the area of contact of the finger or thumb with the touch-sensitive display 118, when an area of a touch is determined.

The size of the identified features is increased at 212. The size of the identified features may be increased by increasing a displayed size of the features as well as a target size of the features. The target is the area of the touch-sensitive display 118 that is associated with the displayed feature such that when a touch is located within the area at the time of selection, the associated feature is selected. The target areas and the displayed size of the features may differ. Alternatively, the size of the identified features may be increased without increasing the target size. According to still another alternative, the target size of the identified features may be increased without increasing the displayed size of the identified features. The remaining selectable features that are not identified at 210 are displayed at their default size(s).

When the gesture ends at 214, the selectable feature at which the touch was located immediately prior to the gesture ending, is selected at 220. Touch detection is repeatedly determined at regular intervals in time and the gesture is determined to have ended when the gesture, or touch, is no longer detected on the touch-sensitive display 118.

When the gesture has not ended, the direction of the gesture is determined again at 216. To determine the direction of the gesture, two points along the path of the gesture are utilized to determine a vector that describes the direction. The two points that are utilized may be points separated by a predetermined, or minimum distance, or may be two points taken at two different times. The direction of the gesture as determined at 216 is compared to the previously determined direction of the gesture to determine when a change in direction has occurred. A change in direction may be determined when the direction of the gesture differs from the previously determined direction of the gesture by, for example, a threshold angle. Alternatively, a change in direction may be determined when the location of the touch is at some threshold distance from a line in the previously determined direction of the gesture.

When a change in direction is determined at 218, the feature at which the touch is located when the change occurs, is selected at 222. When a change in direction is not detected at 218, the process continues at 210 without selecting a feature.

Based on the location of the touch and based on the direction, selectable features that are displayed on the touch-sensitive display 118 are again identified at 210. As described, the selectable features identified may be, for example, features that lie in the direction, beginning at the location of the touch at the time the direction is determined. Features that are located behind the location of the touch at the time the direction is determined, or in the opposite direction, are not identified. Features that are not identified are displayed at a default size.

The size of each identified feature may be increased at 212 based on the distance between the identified feature and the location of the touch. For example, the increase in size may be greater for features that are nearer to the location of touch. As the gesture continues, the size of the features may be adjusted dynamically to increase the size of features as the distance between the features and the location of touch decreases. Thus, the size of the identified features may differ depending on distance to the location of touch. As the gesture continues along a path, selectable features that were previously identified and for which the size was previously increased, are returned to their default size when the features are no longer identified.

Examples of a touch-sensitive display illustrating selectable features are shown in FIG. 3 through FIG. 6. For the purpose of the present examples, the portable electronic device 100 is shown in the process of composing email in an email application. In these examples, keys are displayed in a virtual QWERTY keyboard 302 in the email application at 202. Each of the keys appears to be separated from the other keys in that the displayed representation of the keys do not share displayed boundaries. For the purpose of these examples, the target area for each key is equal to the displayed representation of the key.

Information including a header 304 and a body 306 of the email being composed is shown above the keyboard 302 in the orientation illustrated. A cursor is located within the body 306 of the email for adding characters in the example of FIG. 3. Prior to the start of a gesture, the keys of the keyboard 302 are displayed at their default size at 202.

Figure 3:
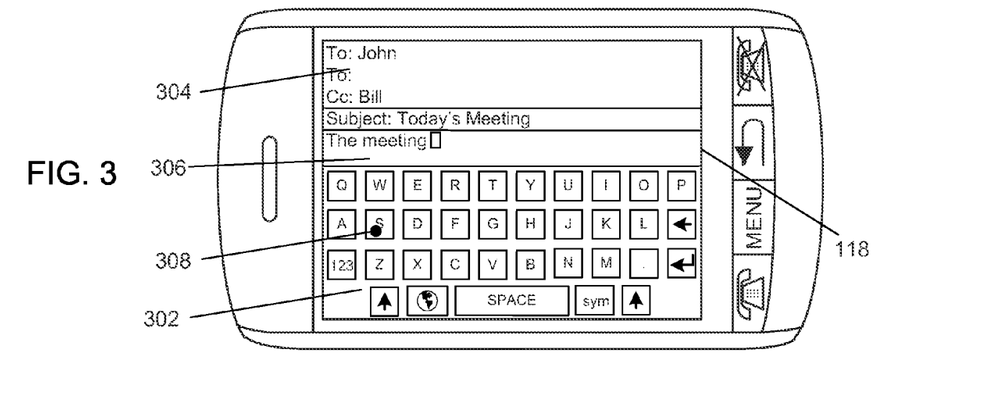
FIG. 3 through FIG. 6 show examples of a touch-sensitive display illustrating selectable features according to one example of the method of FIG. 2.

A gesture begins at FIG. 3 at the origin point 308 illustrated by the black circle. The selectable feature associated with the origin point of the gesture, which in this example is a key 412 associated with the letter "S", is selected at 206.

Figure 4:
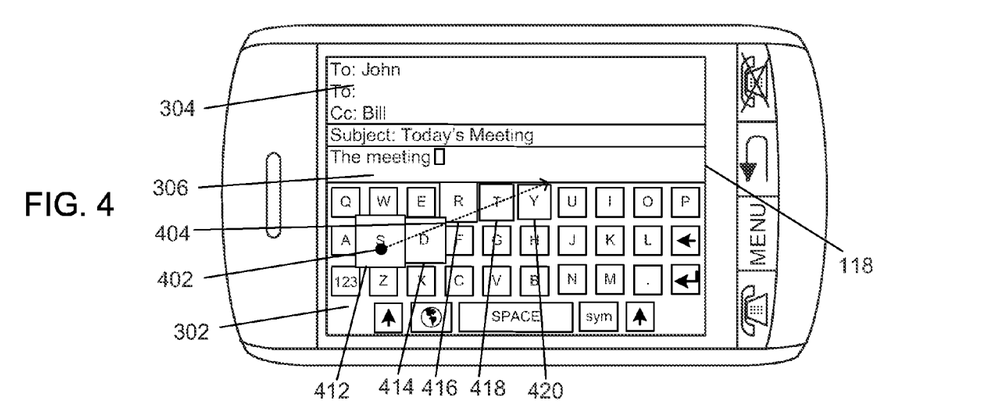

A direction of the gesture is determined at 208 utilizing, for example, the origin point and a subsequent location 402 along the path of the gesture. The direction of the gesture is illustrated by the arrow 404. Based on the location 402 of the touch at the time the direction is determined and based on the direction 404, selectable features that are displayed on the touch-sensitive display 118 are identified at 210. In the present example, the selectable features that lie in the direction 404, beginning at the most recently determined location 402 of the touch and ending at a boundary 406 of the keyboard 302 are identified. These selectable features include the keys 412, 414, 416, 418, 420 associated with the alphabetical letters "S", "D", "R", "T", and "Y", respectively.

The size of the identified features is increased at 212 by increasing both the displayed size and the target size. The size of the each identified feature is increased based on the distance between the identified feature and the location of the touch. The increase in size of the key 412 associated with the letter "S" is greater than the increase in size of any of the other identified keys 414, 416, 418, 420 as the touch 402 is located on the key 412 associated with the letter "S". The increase in size of the key 420 associated with the letter "Y" is less than the increase in size of the other identified keys 412, 414, 416, 418, as the key 420 is located the farthest from the touch 402. The increase in size of the keys 414, 416, and 418 varies based on the distance of each of the keys 414, 416, and 418 to the touch 402.

Figure 5:
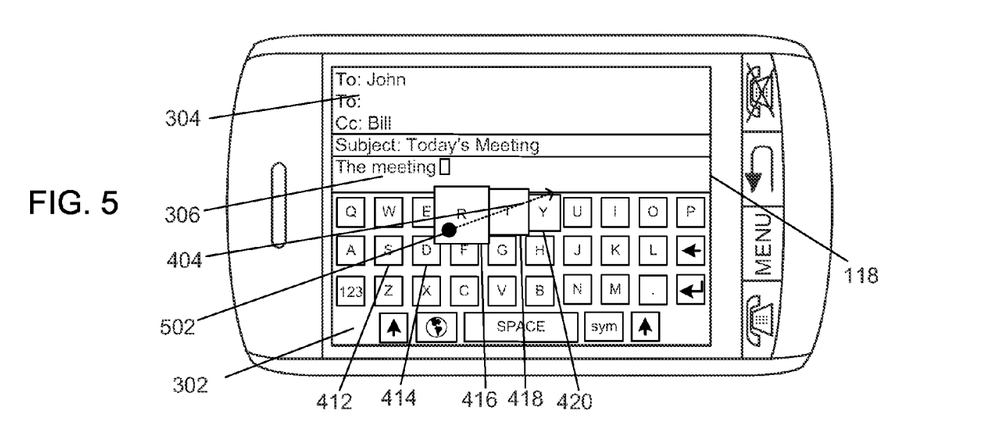

The gesture continues at 214 and a new location 502 is utilized to determine the direction at 216. The direction has not changed at 218 and the process continues at 210 wherein the features are identified based on the direction 404.

Based on the location 502 of the touch at the time the direction is determined and based on the direction 404, selectable features that are displayed on the touch-sensitive display 118 are again identified at 210. In the present example, the selectable features that lie in the direction 404, beginning at the most recently determined location 502 of the touch and ending at a boundary 406 of the keyboard 302, are identified. These selectable features include the keys 416, 418, 420 associated with the alphabetical letters "R", "T", and "Y", respectively. The keys 412, 414 are no longer identified and are therefore displayed at their default sizes.

The size of the identified features is increased at 212 by increasing both the displayed size and the target size. The increase in size of the key 416 associated with the letter "R" is greater than the increase in size of the other identified keys 418, 420 as the touch 502 is located on the key 416 associated with the letter "R". The increase in size of the key 420 associated with the letter "Y" is less than the increase in size of the identified keys 416, 418, as the key 420 is located the farthest from the touch 502.

Continuing with the example illustrated and described with reference to FIG. 3 though FIG. 5, the gesture continues in the direction 404, and a change in direction is determined when the location of touch is at 602. The direction 604 of the gesture is illustrated by the arrow in FIG. 6. When the change in direction is detected at 218, the key 418 associated with the letter "T" is selected at 222 and the selectable features are identified based on the location of the touch 602 and the direction 604. The selectable features that are identified include the keys 418, 416, 412, 606 associated with the alphabetical letters "T", "R", "S", and "A", respectively. The remainder of the keys are displayed at their default sizes.

Figure 6:
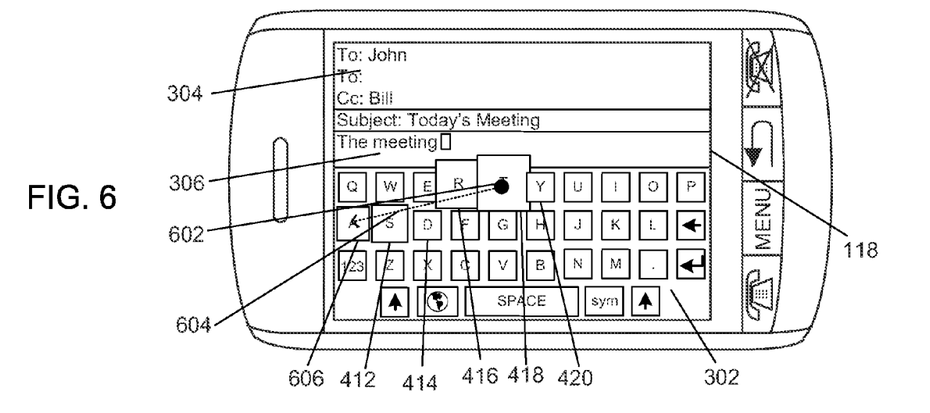

In the example illustrated in FIG. 6, the size of the keys of the keyboard increases and at least some of the keys 418, 416, associated with the alphabetical letters "T" and "R" overlap the body 306 of the email, which is adjacent to the keyboard 302. The remaining selectable features that are not identified at 208 are displayed at their default size(s). The keys 418, 416 that overlap the body 306 of the email are illustrated as being opaque in FIG. 6. Optionally, keys that overlap the adjacent area, which in these examples, is a body 306 of the email, may be illustrated as translucent or transparent.

Figure 7:
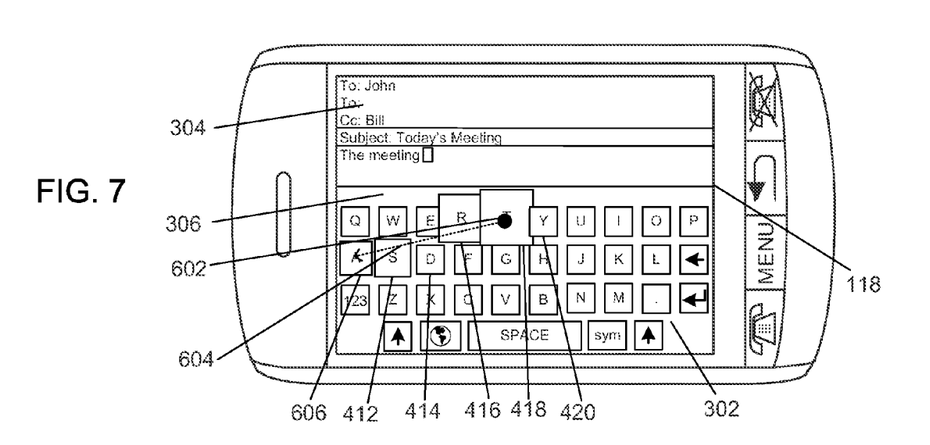
FIG. 7 shows an example of a touch-sensitive display illustrating selectable features according to another example of the method of FIG. 2.

Alternatively, the header 304 and the body 306 of the email may be resized as the area of the keyboard 302 is increased to accommodate the increase in size of the keys. In the example illustrated in FIG. 7, the header 304 and the body 306 of the email are reduced and a smaller font size is utilized to decrease the header 304 and the body 306 and to increase the area of the keyboard 302.

Figure 8:
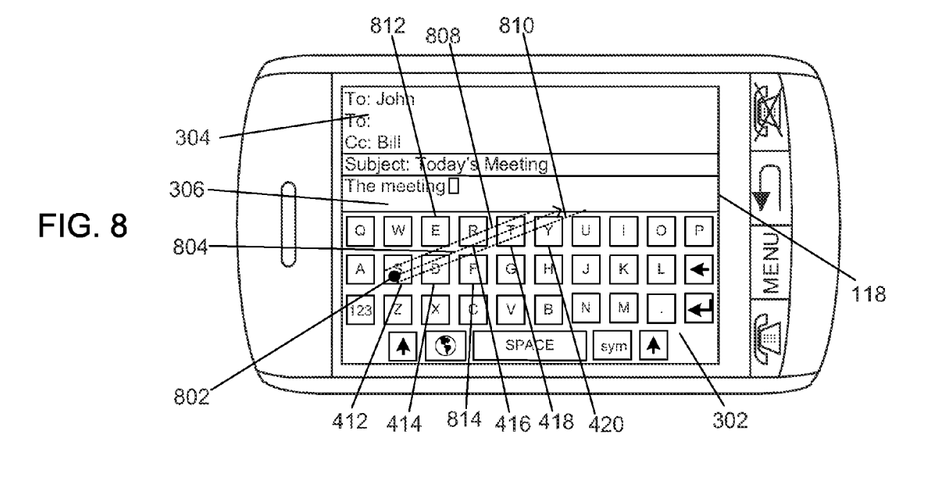
FIG. 8 and FIG. 9 show examples of a touch-sensitive display illustrating selectable features according to another example of the method FIG. 2.
Figure 9:
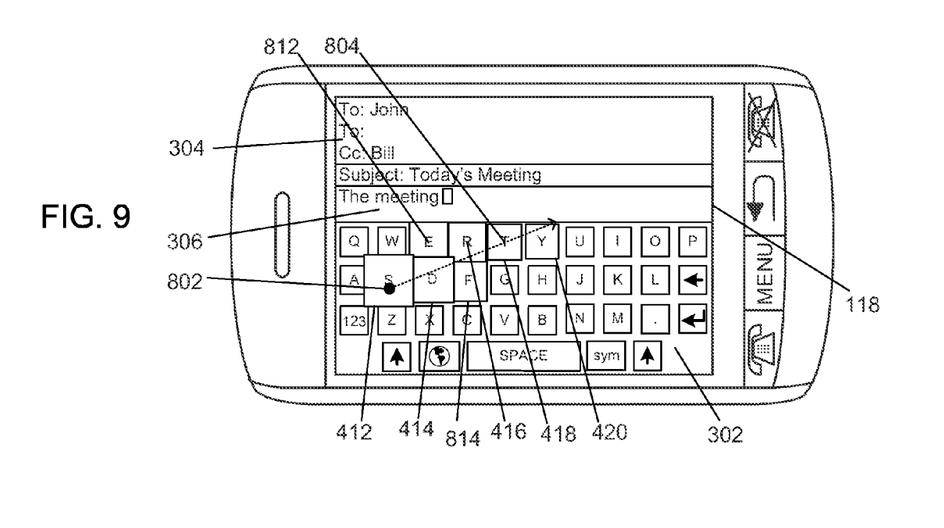

Another example of a portable electronic device 100 including a touch-sensitive display 118 is illustrated in FIG. 8 and FIG. 9. Again, for the purpose of the present example, the portable electronic device 100 is shown in the process of composing an email in an email application. Prior to the start of a gesture, the keys of the keyboard 302 are displayed at their default size at 202.

A gesture is detected at 204. The gesture begins at an origin point and the selectable feature associated with the origin point of the gesture, which in this example is a key 412 associated with the letter "S", is selected at 206.

A direction of the gesture is determined at 208 utilizing, for example, the origin point and a subsequent location 802 along the path of the gesture. The direction of the gesture is illustrated by the arrow 804. Based on the location 802 of the touch at the time the direction is determined and based on the direction 804, selectable features that are displayed on the touch-sensitive display 118 are identified at 210. In the present example, the selectable features that lie within a threshold distance of the line of the direction 804, beginning at the most recently determined location 802 of the touch and ending at the boundary of the keyboard 302 are identified. The threshold distance from the line illustrating direction 804 in FIG. 8, is illustrated by parallel lines 808, 810 on each side of the direction 804. The threshold distance may be a preset distance or may be set based on, for example, size of a contact area of the gesture with the touch-sensitive display 118. Selectable features that lie between or that include parts that lie between the parallel lines are identified at 210.

As in the example described above with reference to FIG. 4, the selectable features identified in the present example include the keys 412, 414, 416, 418, 420 associated with the alphabetical letters "S", "D", "R", "T", and "Y", respectively. Additionally, the keys 812 and 814 associated with the letters "E" and "F", respectively are identified in the present example.

The size of the identified features is increased at 212 by increasing both the displayed size and the target size. The size of the each identified feature is increased based on the distance between the identified feature and the location of the touch. The increase in size of the keys 412, 414, 416, 418, 420, 812, 814 varies based on the distance of each of the keys to the touch 802.

Figure 10:
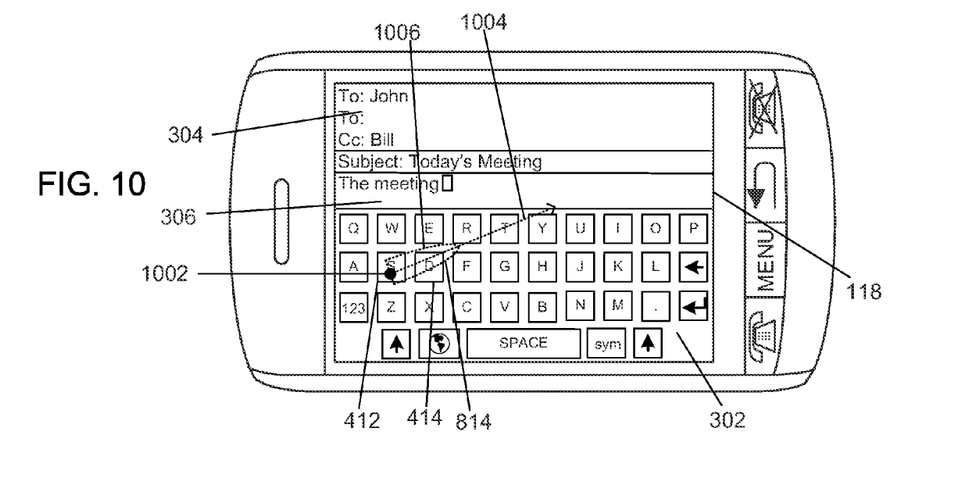
FIG. 10 and FIG. 11 show examples of a touch-sensitive display illustrating selectable features according to yet another example of the method FIG. 2.
Figure 11:
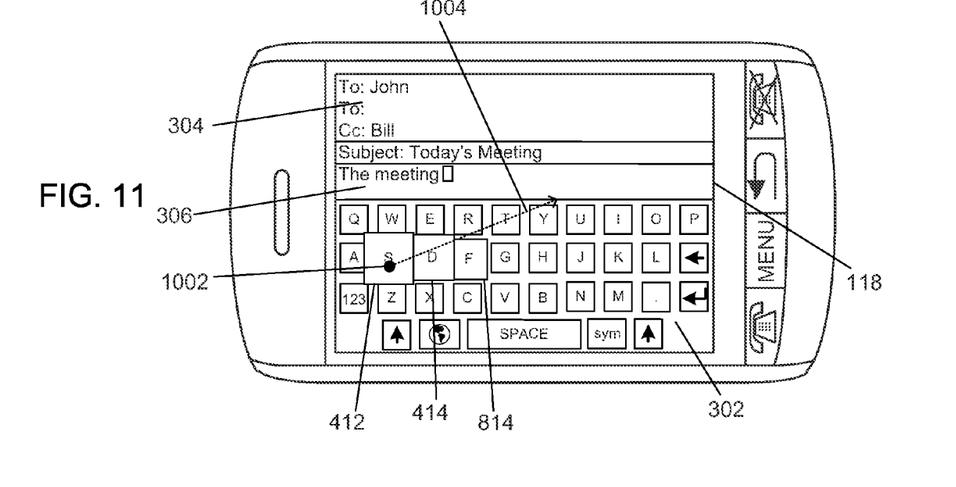

Another example of a portable electronic device 100 including a touch-sensitive display 118 is illustrated in FIG. 10 and FIG. 11. Again, for the purpose of the present example, the portable electronic device 100 is shown in the process of composing email in an email application. Prior to the start of a gesture, the keys of the keyboard 302 are displayed at their default size at 202.

A gesture is detected at 204. The gesture begins at an origin point and the selectable feature associated with the origin point of the gesture, which in this example is the key 412 associated with the letter "S", is selected at 206.

A direction of the gesture is determined at 208 utilizing, for example, the origin point and a subsequent location 1002 along the path of the gesture. The direction of the gesture is illustrated by the arrow 1004. Based on the location 1002 of the touch at the time the direction is determined and based on the direction 1004, selectable features that are displayed on the touch-sensitive display 118 are identified at 210. In the present example, the selectable features that lie within a partial ellipse 1006 determined by the location 1002 of the touch and whose major axis lies in the direction 1004, are identified. The lengths of the axes of the ellipse may be any suitable lengths and may be preset or set based on a factor or factors such as a the area of contact of the touch with the touch-sensitive display 118. A partial ellipse is provided as one example and other suitable shapes, such as a rectangle, may be utilized.

Selectable features that lie within the partial ellipse or that include a part that lies within the partial ellipse, are identified at 210. The selectable features identified in the present example include the keys 412, 414, 814 associated with the letters "S", "D", and "F", respectively. The size of the identified features is increased at 212. The size of the each identified feature may be increased based on the distance between the identified feature and the location of the touch.

In the examples provided, the selectable features are keys of a keyboard in an email application interface. The email application interface is illustrated to provide an example. The present disclosure is not limited to an email application interface as selectable features such as keys of a keyboard may be provided in, for example, a Web browser application, a calendar application, an address book application, a GPS navigation application, or any other suitable application. Further, other selectable features may be utilized including, for example, other keyboards such as an AZERTY keyboard or QWERTZ keyboard. Optionally, the displayed representations of selectable features may be round or any other suitable shape.

A method of controlling a portable electronic device includes displaying one or more selectable features on a touch-sensitive display of a portable electronic device, detecting a gesture on the touch-sensitive display, identifying at least one of the selectable features based on a direction of the gesture, and increasing a size of the at least one of the selectable features.

A computer-readable medium has computer-readable code embodied therein. The computer-readable code is executable by at least one processor of a portable electronic device to perform the method.

A portable electronic device includes a touch-sensitive display and a processor coupled to the touch-sensitive display to detect a gesture on the touch-sensitive display, identify a displayed selectable feature based on the direction of the gesture, and increase a size of the displayed selectable feature.

Sizes of selectable features may be increased in a direction of a gesture, for example, during swipe typing on a touch-sensitive display. Thus, a user slides a finger or thumb along the keyboard, the direction of the gesture is determined and keys that in the direction of movement are increased in size. The increase in feature size facilitates identification of the selectable feature during the gesture and facilitates selection, thereby providing an improved interface that facilitates device use.

According to one aspect, a method includes displaying one or more selectable features on a touch-sensitive display of a portable electronic device, detecting a gesture on the touch-sensitive display, identifying at least one of the selectable features based on a direction of the gesture, and increasing a size of the at least one of the selectable features.

According to another aspect, a computer-readable medium has computer-readable code executable by at least one processor of a portable electronic device to perform the above method.

According to another aspect, a portable electronic device includes a touch-sensitive display and a processor coupled to the touch-sensitive display to detect a gesture on the touch-sensitive display, identify a displayed selectable feature based on the direction of the gesture, and increase a size of the displayed selectable feature.

The present disclosure may be embodied in other specific forms without departing from its spirit. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    displaying selectable features on a touch-sensitive display of a portable electronic device;
    detecting a gesture on the touch-sensitive display;
    determining a direction of the gesture on the touch-sensitive display utilizing a first point along a path of the gesture and a second point that is subsequent to the first point and that lies along the path of the gesture, wherein the first point and the second point are in a line of direction;
    identifying a plurality of the selectable features that are displayed along a path in the direction of the gesture and that are located within a threshold distance of the line of direction;
    increasing a size of each of the plurality of selectable features that are identified; and
    when a change in the direction of the gesture on the touch-sensitive display is detected, selecting one of the plurality of the selectable features that are identified at a location of the touch-sensitive display where the change occurs;
    wherein the size of each of the plurality of selectable features is increased in proportion to the distance between the location of the gesture on the touch-sensitive display and a respective one of the plurality of selectable features such that the size of the selectable features that are identified changes dynamically with the location of the gesture on the touch-sensitive display;
    wherein a plurality of unidentified selectable features are displayed at a default size, the plurality of unidentified selectable features including:
        a selectable feature, of the plurality of selectable features, adjacent to the first point and located in an opposing direction of the line of direction; and
        selectable features that are not located within the threshold distance from the line of direction.

2. The method according to claim 1, wherein increasing the size comprises increasing the displayed area of the at least one of the selectable features.

3. The method according to claim 1, wherein increasing the size comprises increasing a target area associated with the at least one of the selectable features.

4. The method according to claim 1, wherein the selectable features comprise keys of a keyboard.

5. The method according to claim 1, comprising repeatedly identifying features that are displayed along a path in the direction of the gesture on the touch-sensitive display to dynamically adjust the size of each of the plurality of selectable features that are identified.

6. The method according to claim 1, comprising when an end of the gesture on the touch-sensitive display is detected, selecting the one of the plurality of selectable features that are identified based on the location of the gesture on the touch-sensitive display when the gesture ends.

7. The method according to claim 1, wherein the selectable features comprise keys of a keyboard and wherein the method further comprises, when an end of the gesture on the touch-sensitive display is detected, selecting one of the keys based on the location of the gesture on the touch-sensitive display when the gesture ends.

8. The method according to claim 1, wherein the selectable features are displayed in a first area of the touch-sensitive display and the size of each of the plurality of the selectable features that are identified increases to overlap a second area of the touch-sensitive display.

9. The method according to claim 8, wherein the second area is adjacent the first area.

10. The method according to claim 1, wherein the selectable features are displayed in a first area of the touch-sensitive display and the size of the first area is increased to accommodate the increase in size of each of the plurality of the selectable features that are identified.

11. A non-transitory computer-readable medium having computer-readable code executable by at least one processor of the portable electronic device to detect a gesture on the touch-sensitive display, determine a direction of the gesture on the touch-sensitive display utilizing a first point along a path of the gesture and a second point that is subsequent to the first point and that lies along the path of the gesture, wherein the first point and the second point are in a line of direction, identify a plurality of the selectable features that are displayed along a path in the direction of the gesture and that are located within a threshold distance of the line of direction, and increase a size of the plurality of selectable features that are identified, and when a change in direction of the gesture is detected, select one of the plurality of the selectable features based on a location of the gesture on the touch-sensitive display when the change occurs,     wherein the size of each of the plurality of selectable features is increased in proportion to the distance between the location of the gesture on the touch-sensitive display and a respective one of the plurality of selectable features such that the size of the selectable features that are identified changes dynamically with the location of the gesture on the touch-sensitive display, and     wherein a plurality of unidentified selectable features are displayed at a default size, the plurality of unidentified selectable features including:

a selectable feature, of the plurality of selectable features, adjacent to the first point and located in an opposing direction of the line of direction; and         selectable features that are not located within the threshold distance from the line of direction.

12. A portable electronic device comprising:
a touch-sensitive display; and
a processor coupled to the touch-sensitive display and configured to:
    display selectable features on the touch-sensitive display;
    detect a gesture on the touch-sensitive display;
    determine a direction of the gesture on the touch-sensitive display utilizing a first point along a path of the gesture and a second point that is subsequent to the first point and that lies along the path of the gesture, wherein the first point and the second point are in a line of direction;
    identify a plurality of the selectable features that are displayed along a path in the direction of the gesture and that are located within a threshold distance of the line of direction;
    increase a size of the plurality of selectable features that are identified; and
    when a change in direction of the gesture is detected, select one of the plurality of selectable features that is identified at a location of the touch-sensitive display where the change occurs;

wherein the size of each of the plurality of selectable features is increased in proportion to the distance between the location of the gesture on the touch-sensitive display and a respective one of the plurality of selectable features such that the size of the selectable features that are identified changes dynamically with the location of the gesture on the touch-sensitive display; and     wherein a plurality of unidentified selectable features are displayed at a default size, the plurality of unidentified selectable features including:

a selectable feature, of the plurality of selectable features, adjacent to the first point and located in an opposing direction of the line of direction; and         selectable features that are not located within the threshold distance from the line of direction.

13. The portable electronic device according to claim 12, wherein the processor is configured to, when an end of the gesture on the touch-sensitive display is detected, select one of the selectable features based on the location of the gesture on the touch-sensitive display when the gesture ends.

\* \* \* \* \*